Oct. 29, 1963  H. C. SWIFT  3,108,659
BRAKE CONSTRUCTION WITH ANTI-FRICTION BEARING MEANS
Filed May 17, 1962  2 Sheets-Sheet 2
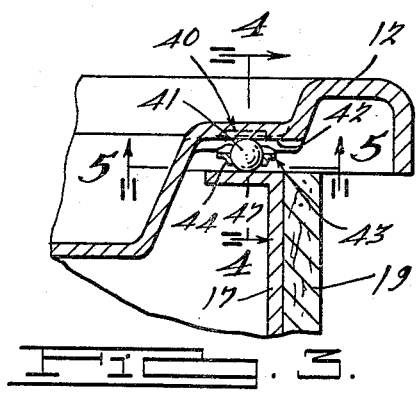
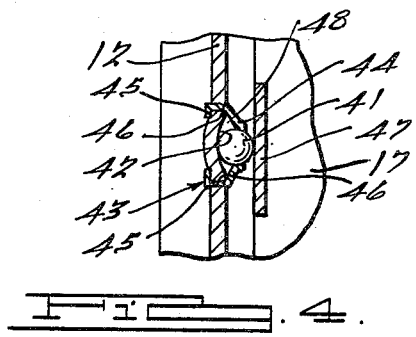
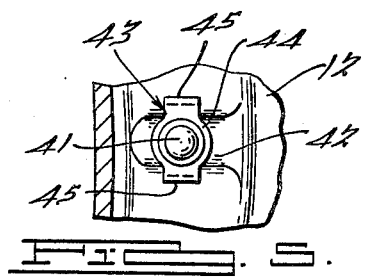
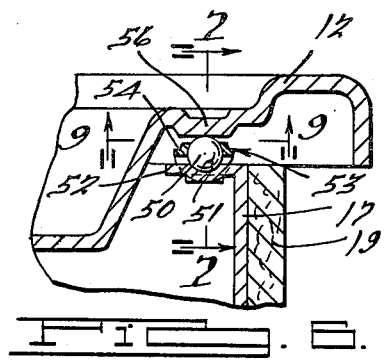
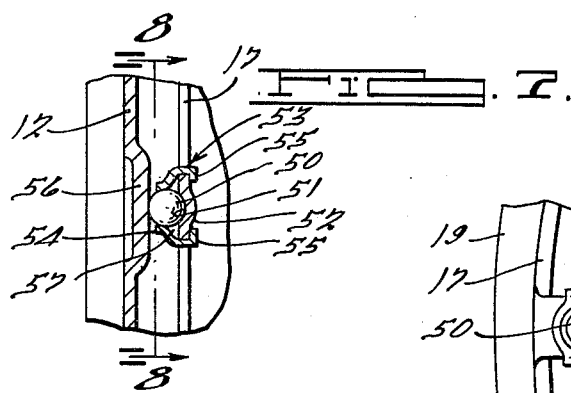
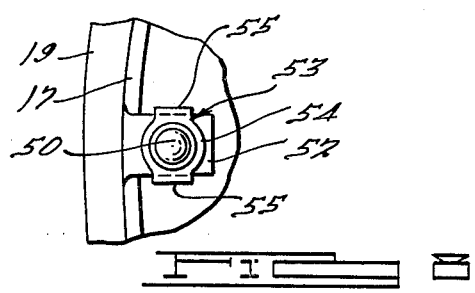
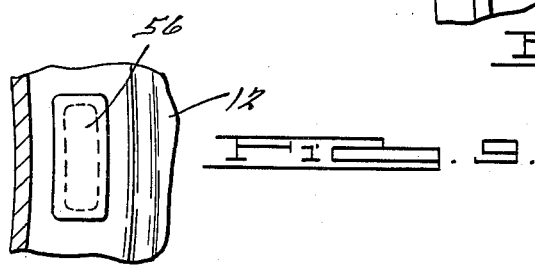
INVENTOR.
Harvey C. Swift.
BY
Harness, Dickey & Pierce
ATTORNEYS.

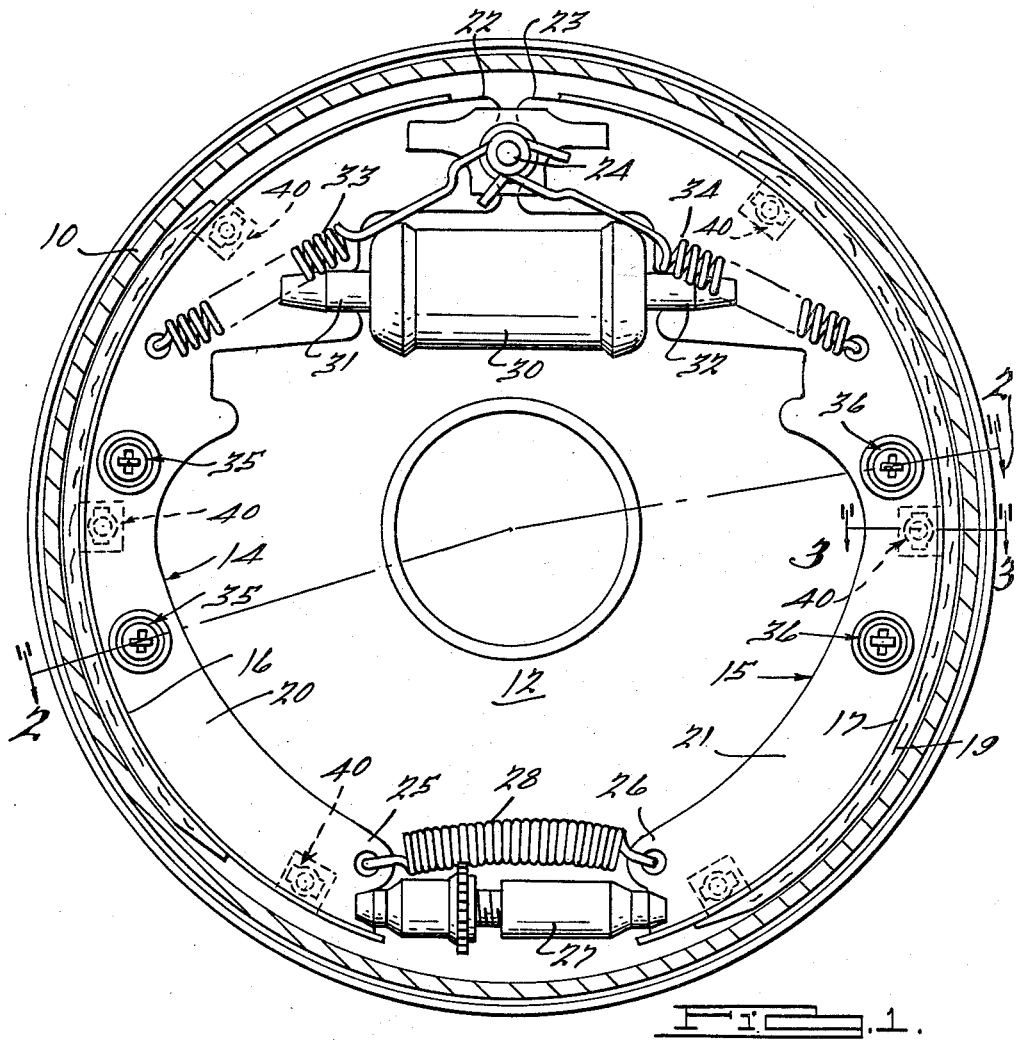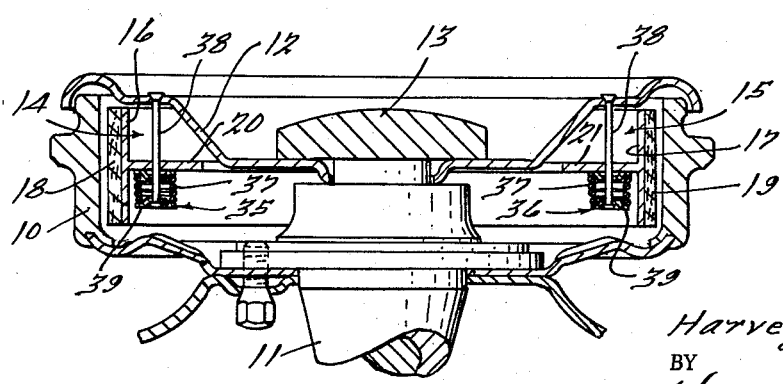

United States Patent Office 3,108,659
Patented Oct. 29, 1963

3,108,659
BRAKE CONSTRUCTION WITH ANTI-FRICTION BEARING MEANS
Harvey C. Swift, Birmingham, Mich., assignor to Kelsey-Hayes Company, Romulus, Mich., a corporation of Delaware
Filed May 17, 1962, Ser. No. 195,504
3 Claims. (Cl. 188—78)

This invention relates to vehicle brakes and particularly to drum type brakes that comprise an annular brake drum, arcuate brake shoes having rim portions supporting brake linings, and a stationary backing plate upon which the brake shoes are supported, with the edges of the rim portions thereof in engagement therewith, and with respect to which the brake shoes are movable upon actuation thereof by the brake actuating mechanism.

In prior art structures, the metallic engagement of the rim of the brake shoe with the backing plate has resulted in an undesirably high coefficient of friction. Inasmuch as the brake shoes are held against the backing plate by springs or the like, considerable initial pedal effort has been required to overcome this frictional force and produce radial expansion of the shoes into contact with the drum. The magnitude of the frictional resistance of the shoes to movement increases as the backing plate becomes rusted, corroded or otherwise roughened. Also, the metal-to-metal sliding contact of the brake shoes on the backing plate can produce objectionable noise or squeaks.

Heretofore, various attempts have been made to eliminate friction between the shoe and backing plate and to provide for a freer, smoother movement of the brake shoe over the surface of the backing plate. Such prior attempts at eliminating the incumbent objections and deficiencies in prior art brake structures have resulted in mere temporary or transitory relief requiring periodic attention to insure continuous satisfactory operation.

It is therefore an object of this invention to provide substantially frictionless bearing surfaces between the brake shoe and backing plate which will be noiseless and which will prevent spasmodic or uneven movement of the brake shoes upon application of the brakes.

Another object of this invention is to provide a bearing between the brake shoe and backing plate which will be permanently quite and substantially frictionless throughout the life of the brake or at least for extended periods of time.

Another object of this invention is to provide a bearing of this type having complementary bearing parts carried respectively by the brake shoe and backing plate cooperating when the brake is assembled to provide a noiseless and frictionless bearing between these parts.

A more particular object of this invention is to provide a simple bearing between the backing plate and brake shoes. In the particular embodiment of the invention herein described this bearing comprises a ball and socket carried by one of said parts and a complementary bearing surface carried by the other part. The socket includes a cavity to retain a lubricant whereby the bearing will remain lubricated for extended periods of time.

Further objects of this invention are to provide a device of this type which is efficient, durable, compact, and of simple construction, comprising a minimum number of parts, whereby it may be economically manufactured and assembled with facility.

Various other objects and advantages and the novel details of construction of the invention, will become more apparent as this description proceeds, especially when considered in connection with the accompanying drawings in which:

FIGURE 1 is a sectional elevational view of a brake incorporating features of this invention;

FIGURE 2 is a transverse sectional view taken substantially on the plane indicated by line 2—2 in FIGURE 1;

FIGURE 3 is an enlarged detail sectional view taken substantially on the plane indicated by line 3—3 in FIGURE 1;

FIGURE 4 is a sectional view taken substantially on the plane indicated by line 4—4 in FIGURE 3;

FIGURE 5 is a sectional elevational view taken substantially on the plane indicated by line 5—5 in FIGURE 3;

FIGURE 6 is a view similar to FIGURE 3 showing a modified form of construction;

FIGURE 7 is a sectional view taken substantially on the plane indicated by line 7—7 in FIGURE 6;

FIGURE 8 is an elevational view taken substantially on the plane indicated by line 8—8 in FIGURE 7; and FIGURE 9 is a sectional elevational view taken substantially on the plane indicated by line 9—9 in FIGURE 6.

The illustrative embodiments of the invention are shown in the drawings as applied to a brake structure of the internal expanding type comprising arcuate brake shoes adapted to cooperate with the inner surface of the brake drum. In FIGURES 1 and 2, the reference character 10 indicates a brake drum that is mounted on the wheel hub 11 for rotation therewith. A stationary backing plate 12 is mounted on a stationary part 13 of the vehicle.

In addition to the elements already described, the basic elements of the brake structure comprise a pair of brake shoes 14 and 15 in the form of arcuate segments, said brake shoes being provided with arcuate rim portions 16 and 17 supporting lining elements 18 and 19, respectively. The rim portions 16 and 17 are reinforced against flexure by web portions 20 and 21 extending perpendicularly from the rim portions 16 and 17.

The adjacent ends 22 and 23 of the brake shoes 14 and 15 engage an anchor pin 24 fixed to the backing plate 12. The opposite adjacent ends 25 and 26 of the brake shoes 14 and 15 engage an adjusting strut 27, with shoe ends 25 and 26 being retained in engagement with the adjusting strut by means of a tension spring 28.

A hydraulic wheel cylinder 30 having plunger members 31 and 32 extending from opposite ends thereof into engagement with the webs 20 and 21 provides the actuating device for moving the brake shoes 14 and 15 into engagement with the brake drum 10. The plunger members 31 and 32 extend from piston members (not shown) within the wheel cylinder 30, hydraulic fluid being delivered into the wheel cylinder between the piston members from a conventional brake pedal operated master cylinder (not shown). Retraction springs 33 and 34 normally retain the ends 22 and 23 of the brake shoes in engagement with the anchor pin 24 when hydraulic pressure is released from the wheel cylinder 30.

The brake shoes 14 and 15 are resiliently urged into engagement with the backing plate 12 by spring assemblies 35 and 36. Each spring assembly (see FIGURE 2) comprises a spring 37 held under compression by a rod 38 that extends from the backing plate 12 and has a cap 39 to hold the spring between the cap and the web of the brake shoes, thereby resiliently urging the brake shoes toward the backing plate.

It will be understood that in the operation of the brake, the brake shoes 14 and 15 move relatively to the stationary backing plate 12, and it is the purpose of this invention to provide bearing members between the rims of the brake shoes and the backing plate which will substantially eliminate the noise and friction occasioned by this movement of the brake shoes.

In accordance with this invention, a plurality of bearings 40, here shown as three for each shoe, are provided between the rims of the brake shoes 14 and 15 and the backing plate 12. One form of such bearing is illustrated in FIGURES 3, 4 and 5. This bearing comprises a ball bearing 41 seated in a socket-like depression 42 in the backing plate 12. A complementary ball retaining clip 43 retains the ball bearing in place. This clip 43 comprises a ball engaging socket portion 44 and tongue-like end portions 45 adapted to extend through slots or apertures 46 in the backing plate 12 and to be clinched over as shown in FIGURE 4 to hold the ball retaining clip in place.

The rim 16 or 17 is provided with an ear or projection forming a ledge 47 constituting a bearing surface with which the ball 41 engages. The ball 41 is preferably formed of metal, although, obviously, it may be formed of any suitable low-friction material.

With the construction just described, it will be understood that as the brake shoe moves relative to the backing plate, the ledge 47 will move on the ball 41 to provide a substantially frictionless bearing between these parts. The depression 42 and the complementary ball retaining clip 43 form a cavity 48 to retain a lubricant (not shown) whereby the bearing will remain lubricated for extended periods of time.

In the modification shown in FIGURES 6, 7, 8 and 9, the parts are reversed and the ball bearing is carried by the rim 16 or 17. In this form of construction, the ball bearing is indicated by the reference character 50, the ball being seated in a depression 51 formed in an ear or ledge 52 extending laterally from the rim 16 or 17. A complementary ball retaining clip 53 has a socket portion 54 engaging the ball, the end portions of the clip 53 being bent around and clinched over the edges of the ledge or ear 52, as indicated at 55 in FIGURES 7 and 8.

In this form of construction, it is preferable, although not necessary, that a bearing surface, such as indicated at 56, be formed on the backing plate 12 by offsetting a portion of the metal thereof laterally. However, as will be obvious, the ball 50 may directly engage the backing plate 12 without the intermediary of the bearing surface 56. The bearing assembly comprises a cavity 57 which may be filled with lubricant, whereby the bearing will remain lubricated for extended periods of time.

While two forms of commercially practical embodiments of the invention have been described and illustrated herein somewhat in detail, it will be understood that various changes may be made as may come within the purview of the accompanying claims.

What is claimed is:

1. A brake comprising a backing plate part, a brake shoe part having a rim supported on said backing plate part for movement relative thereto upon application of the brake, and a substantially frictionless bearing between said parts comprising, a socket-like depression in said backing plate, a ball bearing in said depression, a complementary ball retaining clip secured to said backing plate for holding said ball in said depression, and a laterally extending ear on said rim constituting a bearing surface with which said ball engages.

2. A brake comprising a backing plate part, a brake shoe part having a rim supported on said backing plate part for movement relative thereto upon application of the brake, and a substantially frictionless bearing between said parts comprising, a laterally extending ear on said rim, a socket-like depression formed in said ear, a ball bearing in said depression, a complementary ball retaining clip secured to said ear for holding said ball in said depression, and a ledge on said backing plate forming a bearing surface with which said ball engages.

3. A brake comprising a backing plate part, a pair of brake shoe parts each having a rim supported on said backing plate for movement relative thereto upon application of the brake, and a plurality of substantially frictionless bearings between each brake shoe and the backing plate, each bearing comprising, a socket in one of said parts, a ball bearing in said socket, a ball retaining clip secured to said part for holding said ball in said socket, said socket and retaining clip forming a lubricant retaining cavity, and a bearing surface on the other of said parts with which said ball engages.

References Cited in the file of this patent

UNITED STATES PATENTS

| | | |
|---|---|---|
| 2,695,821 | Crumling | Nov. 30, 1954 |
| 2,726,915 | Schuette | Dec. 13, 1955 |
| 2,796,954 | Kaiser | June 25, 1957 |

FOREIGN PATENTS

| | | |
|---|---|---|
| 1,204,183 | France | Aug. 3, 1959 |